3,495,956
ALUMINUM CHLOROHYDRIDE COMPOSITION AND METHOD OF PREPARATION

Charles B. Roberts, Midland, and Darell D. Toner, Sanford, Mich., assignors to The Dow Chemical Company, Midland, Mich., a corporation of Delaware
No Drawing. Filed July 24, 1967, Ser. No. 655,322
Int. Cl. C01f 7/56
U.S. Cl. 23—365     4 Claims

ABSTRACT OF THE DISCLOSURE

This invention relates to a new composition having the formula $HAl_2Cl_5 \cdot 2C_4H_{10}O$ and to a method for its preparation wherein an etherate of aluminum hydride is reacted with about five molar equivalents of aluminum chloride per mole of aluminum hydride etherate in a diethyl ether solvent at a temperature of between about 0° C. and about 75° C.

BACKGROUND OF THE INVENTION

Aluminum chlorohydrides such as $H_2AlCl$ and $HAlCl_2$ are compounds long known in art. These compounds are solids which occur as ether complexes of diethyl ether, tetrahydrofuran and the like and normally occur as mixtures containing both $H_2AlCl$ and $HAlCl_2$.

SUMMARY OF THE INVENTION

This invention relates to a new compound having the formula $HAl_2Cl_5 \cdot 2C_4H_{10}O$ and to a method for its preparation from the reaction of an aluminum hydride etherate and aluminum chloride in a diethyl ether solvent.

It is an object of this invention, therefore, to provide to the art a new and useful composition. An additional object is to provide a method for the preparation of such novel compound. These and other objects and advantages of the present invention will become apparent from a reading of the following detailed description.

It has now been discovered that an aluminum hydride etherate may be reacted in a diethyl ether solution with aluminum chloride at a temperature of from about 0° C. to about 75° C. in an inert atmosphere, to produce $HAl_2Cl_5$ which is recovered by removing the solvent therefrom. If desired, the product may be purified by distilling the $HAl_2Cl_5$ etherate under reduced pressure.

DESCRIPTION OF THE PREFERRED EMBODIMENTS

In the process of this invention, substantially any etherate of aluminum hydride may be employed. For example, complexes of aluminum hydride with diethyl ether, tetrahydrofuran, dioxane, dimethyl ether of ethylene glycol and the like are sufficiently stable for use as a reactant herein. Usually however, the diethyl etherate of $AlH_3$ is preferred.

The aluminum hydride etherate and aluminum chloride reactants are employed in the process of this invention as a solution in a diethyl ether solvent. The concentration of reactants in the diethyl ether solvent can be as low as about .01 molar or as high as the solubiltiy of the least soluble reactant in the particular solvent. Lower concentrations are undesirable in that unduly large equipment is required, reaction times are increased and it becomes uneconomical to remove and handle large volumes of solvent.

In the initial reaction mixture, the mole ratio of $AlH_3$·etherate to $AlCl_3$ is about 1 to 5. It is desirable to employ the reactants at or near this mole ratio as substantial variation therefrom lowers the yield of the desired product and produces undesirable by-products.

The reactants, after contact in solution, are reacted at a temperature of from about 0° C. to about 75° C., preferably from about 0° C. to about 35° C. It is usually most convenient, however, to conduct the reaction at or near room temperature and at about atmospheric pressure. Pressures above and below atmospheric pressure can be used, however.

The rate of reaction varies somewhat with temperature but a reaction time of between about 1 minute and about 5 minutes is usually sufficient to achieve a substantially complete reaction.

Upon completion of the reaction, the solvent is separated from the reaction mass by any suitable means such as reduced pressure evaporation. A purified product is then obtained by distilling the residue at reduced pressure to cause a pure diethyl etherate of $HAl_2Cl_5$ to pass overhead where it is condensed as a clear colorless liquid. The diethyl etherate of $HAl_2Cl_5$ ($HAl_2Cl_5 \cdot 2C_4H_{10}O$) has a melting point of 4° C. and begins to distill at about 80° C. and 1 mm. of Hg.

The product thus produced is useful in the same manner and for the same purposes as other aluminum chlorohydrides and finds particular utility as a selective reducing agent and as high purity starting material for synthesis work.

The following examples are provided for the purpose of more fully illustrating the invention but are not to be construed as limiting the scope thereof.

EXAMPLE 1

In to a stirred flask having an argon atmosphere and containing 1 gm. of the diethyl etherate of $AlH_3$ (wherein the aluminum content was 52.1%) dissolved in 100 ml. of diethyl ether was added 96.5 millimoles of $AlCl_3$.

The mixture was stirred at room temperature for a period of 30 minutes. At the end of this period, the ether was removed by distillation leaving about 10 gm. of product as a liquid residue. The product was purified by distillation at 80° C. and 1 mm., pressure to produce a substantially pure $HAl_2Cl_5 \cdot 2C_4H_{10}O$, a clear colorless liquid having a melting point of 4° C. This product was further characterized by elemental analysis, infrared and Raman spectroscopy as follows:

ELEMENTAL ANALYSIS

|   | Wt. percent |
|---|---|
| H | 5.6 |
| Al | 14.0 |
| Cl | 48.0 |
| C | 25.7 |
| O (by difference) | 6.7 |

| Infrared Spectrum | | Raman Spectrum | |
|---|---|---|---|
| Cm.⁻¹ | A.I. | Cm.⁻¹ | A.I. |
| 2,988 | M | 318 | M |
| 1,911 | VS | 404 | M |
| 1,393 | S | 444 | M |
| 1,330 | M | 770 | W |
| 1,287 | W | 835 | VW |
| 1,196 | M | 883 | VW |
| 1,152 | M | 1,092 | W |
| 1,094 | M | 1,330 | VW |
| 1,002 | VS | 1,395 | VW |
| 880 | S | 1,450 | W |
| 770 | VS | 1,903 | W |
| 645 | VS | 2,943 | M |
|   |   | 2,990 | M |

VS=very strong; S=strong; M=medium; W=weak; VW=very weak.

Various modifications can be made in the present invention without departing from the spirit or scope thereof for it is understood that we limit ourselves only as defined in the appended claims.

We claim:
1. A process for the preparation of $HAl_2Cl_5$ in etherated form which comprises reacting an etherate of aluminum hydride with about five molar equivalents of aluminum chloride per mole of aluminum hydride in a diethyl ether solvent at a temperature of between about 0° C. and about 75° C. for a time sufficient to achieve substantial conversion to $HAl_2Cl_5$ and separating such product from the diethyl ether solvent.

2. The process of claim 1 wherein the reaction temperature is between about 0° C. and 35° C.

3. The process of claim 1 wherein the reaction is conducted at substantially room temperature and atmospheric pressure for a period of from about 1 to about 5 minutes.

4. The process of claim 1 wherein the product, after separation from the inert solvent, is purified by distillation at reduced pressure.

References Cited

"Chemical Abstracts," vol. 46; 1952, p. 3438.
"Chemical Abstracts," vol. 64; July 1966, p. 1698.

OSCAR R. VERTIZ, Primary Examiner

G. O. PETERS, Assistant Examiner

U.S. Cl. X.R.

260—448